United States Patent [19]

Kretschmer

[11] Patent Number: 4,698,827

[45] Date of Patent: Oct. 6, 1987

[54] GENERALIZED POLYPHASE CODE PULSE COMPRESSOR

[75] Inventor: Frank F. Kretschmer, Laurel, Md.

[73] Assignee: The United States of America as represented by the Secretary of the Navy, Washington, D.C.

[21] Appl. No.: 325,454

[22] Filed: Nov. 27, 1981

[51] Int. Cl.[4] .............................................. G01S 13/28
[52] U.S. Cl. ..................................... 375/86; 342/201; 364/819
[58] Field of Search ........................ 364/728, 819, 726; 375/96, 86; 340/146.2; 370/18, 19, 21; 343/5 FT, 17.2 PC; 342/132, 162, 202, 203, 204, 194, 200, 201

[56] References Cited

U.S. PATENT DOCUMENTS

| | | | |
|---|---|---|---|
| 3,731,311 | 5/1973 | Williams | 342/201 |
| 3,747,099 | 7/1973 | Wong | 342/201 |
| 4,030,033 | 6/1977 | Bibl et al. | 375/96 |
| 4,156,876 | 5/1979 | Debuisser | 364/728 |
| 4,237,461 | 12/1980 | Cantrell et al. | 342/194 |
| 4,313,170 | 1/1982 | Lewis et al. | 364/517 |
| 4,346,475 | 8/1982 | Alexis | 364/728 |

Primary Examiner—Benedict V. Safourek

Attorney, Agent, or Firm—John L. Forrest; Alan P. Klein

[57] ABSTRACT

A decoding device for use in pulse compression radars to decode a novel phase code that has the advantage of precompression bandwidth tolerance. The novel code type is described by the following formula (where $\Delta\phi_{k,p}$ is the phase change at the kth subpulse of the pth subsequence within the width of a phase-modulated pulse):

$$\Delta\phi_{k,p} = (2\pi/N)[k+pN][p-(\tfrac{1}{2})(N-1)]$$

$k=0, 1, 2, \ldots, N-1$
$p=0, 1, 2, \ldots, N-1$ (N any integer)

The input signal is fed into multi-stage I and Q shift registers. Each stage in the shift register is fed into an adder, correlation being effected by first multiplying the real and quadrature parts of the signal stored in the stages of the I and Q shift register by a preselected multiplying factor, the sequence of multiplying factors corresponding to the time-reversed and negative phases of the transmitted pulse. The sum signal at the output of the adder corresponds to the auto-correlation function of the received signal.

4 Claims, 8 Drawing Figures

GENERALIZED POLYPHASE CODE PULSE COMPRESSOR

BACKGROUND OF THE INVENTION

This invention relates generally to polyphase code systems and more particularly to digital systems for decoding sequences of polyphase encoded signals.

In a conventional radar, the transmitted waveform is a train of pulses as shown in FIG. 1a of the accompanying drawing. The average power is determined by the peak power and the duty ratio, that is to say the ratio of the width of the pulses to the overall repetition period T. T is generally fixed by the maximum unambiguous range, and $\tau$ by the resolution required. Thus, to improve the detectability of the radar only the peak power can be increased and this is limited by the components used. There is therefore a conflict of interests if both improved detectability and resolution are required.

It is now recognized that the resolution is not governed by the pulse length but by the overall transmitted bandwidth. Thus, by modulating the carrier within the transmitted pulse length the bandwidth is increased and the resolution improved with no reduction in average transmitted power.

One known form of modulation to effect pulse compression is phase modulation in which, within the width of the transmitted pulse, the phase is changed at specified intervals or subpulses. While these phase changes can follow a random sequence, by using certain well-defined sequences known as "Frank codes" it is possible to reduce the level of the sidelobes after processing of the received pulse. An example of a known method to transmit and detect Frank-coded radar pulses is described in U.S. Pat. No. 4,237,461.

In FIG. 1(b) of the drawing, there is shown the pattern of phase changes within a pulse 11 subdivided into an even number (4) of subsequences of subpulses, 11a–d, each subsequence having four subpulses, $\tau$ seconds long, so forming a Frank code with a pulse compression ratio of $(4)^2 = 16$. The subpulses are at a constant carrier frequency and related to a CW reference signal by a phase angle of (n)(90°), where $0 \leq n \leq 3$. The phase, in radians, encoded on each of the subpulses 11a–d of the pulse 11 may be determined from the matrix of Table 1, as read from left to right progressing from the top to the bottom row.

TABLE 1

| 0 | 0 | 0 | 0 |
|---|---|---|---|
| 0 | $\pi/2$ | $\pi$ | $3\pi/2$ |
| 0 | $\pi$ | 0 | $\pi$ |
| 0 | $3\pi/2$ | $\pi$ | $\pi/2$ |

A counterclockwise phase rotation (phase advance) has arbitrarily been assigned a positive value while a clockwise rotation (phase delay) is assigned a negative value. A phase advance of X radians is equivalent to a phase delay of $2\pi - X$ radians.

The subpulses can be represented by phasors, i.e. defined as vectors in a coordinate system rotating at the carrier frequency of the transmitted pulse. The length of the vector represents the magnitude of the subpulse; its angle with the x axis represents its phase relative to the carrier. The component of the vector along the x axis is in phase with the carrier; the component of the vector along the y axis is 90 degrees out-of-phase with the carrier. If the x axis is designated the real axis and the y axis is designated the imaginary axis, the phase in complex numbers is shown in Table 2. (Note that positive angles are measured in the counterclockwise direction and an advance of phase is represented by a counterclockwise rotation. Thus, a phase shift of $\pi/2$ is $+J$ in complex numbers and a phase shift of $-\pi/2$ is $-j$ in complex numbers).

TABLE 2

| 1 | 1 | 1 | 1 |
|---|---|---|---|
| 1 | $+j$ | $-1$ | $-j$ |
| 1 | $-1$ | 1 | $-1$ |
| 1 | $-j$ | $-1$ | $+j$ |

The phases encoded on the four subpulses of the first subsequence 11a are indicated in the top row of the matrix of Table 1 or Table 2; the phases encoded on the four subpulses of the second subsequence 11b are indicated in the second row of the matrix; the phases for the four subpulses of the third subsequence 11c in the third row; and the phases for the four subpulses of the fourth subsequence 11d in the fourth row. Examining the phases encoded on the four subpulses of each subsequence 11a–d, it will be seen that the phase increases linearly from subpulse to subpulse at a rate of 0 radians per subpulse in the first subsequence 11a; at a rate of $\pi/2$ radians per subpulse in the second subsequence 11b; at a rate of $\pi$ radians per subpulse in the third subsequence 11c; and at a rate of $3\pi/2$ (or $-\pi/2$) radians per subpulse in the fourth subsequence 11d. Examining the slope of the phase increase of each subsequence, it will be seen that the slope increases linearly from subsequence to subsequence at a rate of $\pi/2$ radians per subsequence. Since frequency is the rate of change of phase, linearly increasing phase is a constant frequency. This, each subsequence 11a–d represents a different frequency measured with respect to the carrier frequency, viz. 0, $(\pi/2)/\tau$, $\pi/\tau$, and $(3\pi/2)/\tau$ or $(-\pi/2)/\tau$ respectively for each of the subsequences in order. Since the frequency (slope of phase) also changes linearly by $(\pi/2)/\tau$ from subsequence to subsequence, the Frank code is seen to be a step-wise approximation to a swept frequency.

The amplitude of the auto-correlation function of pulse 11 as might be obtained after the matched filter of a pulse-compression radar receiver is shown in FIG. 1c. This graph shows the level of correlation of a pulse as in FIG. 1b with a similar pulse when plotted against the relative time of the pulses being completed. It will be seen that except at coincidence in time, the correlation function takes on values between 0 and $\sqrt{2}$ and that when the two signals are coincident the correlation function has a value of 16. This means that though the transmitted pulse has an overall duration of $16\tau$, the resolution of the radar is 1 $\tau$ and there is a ratio of 16 to $\sqrt{2}$ between the correlation peak and the peak sidelobes.

FIG. 1d of the drawing shows the pattern of phase changes within a pulse 12 subdivided into an odd number (3) of subsequences of subpulses, 12a–c, each subsequence having three subpulses, $\tau$ seconds long, so forming a Frank code with a pulse compression ratio of $(3)^2 = 9$. The subpulses are at a constant carrier frequency and are related to a CW reference signal by a phase angle of n (120°), where $0 \leq n \leq 2$. The phase in radians, encoded on each of the subpulses 12a–c of the pulse 12 may be determined from the matrix of Table 3, as read from left to right progressing from the top to the bottom row.

TABLE 3

| 0 | 0 | 0 |
|---|---|---|
| 0 | 2π/3 | 4π/3 |
| 0 | 4π/3 | 8π/3 |

The phase in complex numbers is shown in Table 4.

TABLE 4

| 1 | 1 | 1 |
|---|---|---|
| 1 | $-(1/2) + j(\sqrt{3}/2)$ | $-(1/2) - j(\sqrt{3}/2)$ |
| 1 | $-(1/2) - j(\sqrt{3}/2)$ | $-(1/2) + j(\sqrt{3}/2)$ |

Each subsequence 12a–c represents a different frequency measured with respect to the carrier frequency, viz. 0, (2π)/3τ, and (4π)/3τ (or −(2π)/3τ) respectively for each of the subsequences in order.

It is known that the receivers of conventional radars are band-limited. That is to say, the gain of the receiver is inversely-proportional to the frequency deviation from the carrier frequency. Thus, a pulse, such as shown in FIG. 1b, having an even number of subpulse subsequences 11a–d of different frequencies measured with respect to the carrier frequency is attenuated unevenly across the pulse. The end subsequences for which the frequencies are closest to the carrier frequence are attenuated the least, while the center subsequences, for which the frequencies are furthest away from the carrier frequency, are attenuated the most. Specifically, the first, second and fourth subsequences 11a, 11b and 11d having respective frequencies of 0 (carrier frequency) (π/2)/τ and −(π/2)/τ are attenuated the least, while the third subsequence 11c having a frequency of π/τ is attenuated the most. A pulse, such as shown in FIG. 1d, having an odd number of subpulse sequences 12a–c of different frequencies measured with respect to the carrier frequency is also attenuated unevenly across the pulse. The end subsequence whose frequency is at the carrier frequency is attenuated the least while the center and opposite end subsequences whose frequencies are furthest away from the carrier frequency are attenuated the most. Specifically, the first subsequence having a frequency of 0 (carrier frequency) is attenuated the least, while the second and third subsequences having frequencies of (2π)/3τ and −(2π)/3τ are attenuated the most. This inverse weighting disadvantageously reduces the ratio between the correlation peak of the auto-correlation function and the level of the sidelobes. The latter is undesirable because it increases the possibility that weak target echos will be hidden by the sidelobes from an adjacent stronger target echo.

SUMMARY OF THE INVENTION

It is therefore an object of this invention to transmit long coded pulses and to digitally compress the long coded pulses to short pulses of optimum signal-to-noise ratio.

Another object is to use a code that is tolerant of precompression bandwidth limitations.

These and other obJects of the present invention are achieved by a decoding device which decodes the pattern of phase changes with a pulse. The pulse is subdivided into an integral number N or subsequences, each subsequence having N subpulses at which the phase is changed so forming a polyphase code that is tolerant of precompression bandwidth limitations. The decoding device includes a means which provides a decoding phase rotation $-\Delta\phi_{k,p}$ to the kth subpulse in the pth subsequence of the pulse, where $$\Delta\phi_{k,p} = (2\pi/N)[k+pN][p-(\tfrac{1}{2})(N-1)]$$

k = 0, 1, 2, ..., N−1
p = 0, 1, 2, ..., N−1;

and a means which adds the phase-rotated subpulses at the same time.

Additional advantages and features will become apparent as the subject invention becomes better understood by reference to the following detailed description when considered in conjunction with the accompanying drawings wherein:

DETAILED DESCRIPTION

A decoding device which compresses a novel polyphase code that is tolerant of precompression bandwidth limitations will now be described. The decoding device may be used, for example, as block 49 (labelled "decoding unit") in the pulse compression radar system illustrated in FIG. 6 of U.S. application Ser. No. 143,399 (Navy docket number 64,365) now U.S. Pat. No. 4,521,779 by Bernard L. Lewis, filed Apr. 24, 1980 the disclosure of which is hereby incorporated by reference. The novel code type is described by the following formula (where $\Delta\phi_{k,p}$ is the phase change at the kth subpulse of the pth subsequence within the width of a phase modulated pulse):

$$\Delta\phi_{k,p} = (2\pi/N)[k+pN][p-(\tfrac{1}{2})(N-1)]$$

K = 0, 1, 2, ..., N−1
p = 0, 1, 2, ..., N−1 (N any integer)

Figure 1A:
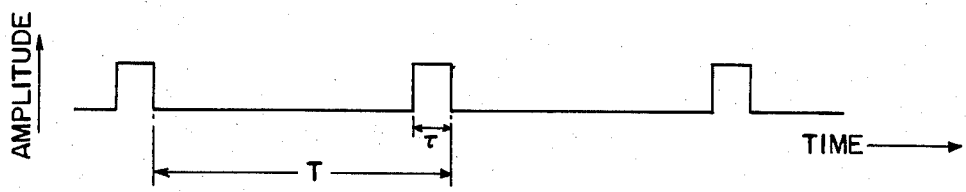
FIGS. 1a–1d depict the pattern of phase changes within transmitted pulses and the amplitude of the auto-correlation function of a pulse.
Figure 1B:
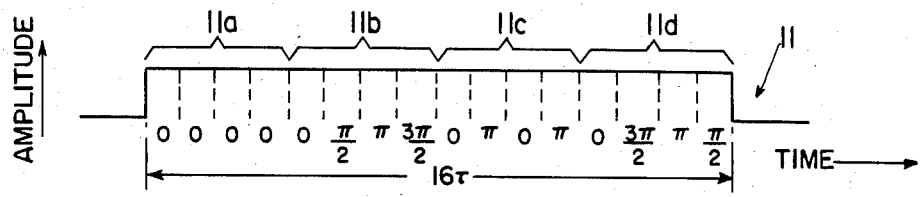
Figure 1C:
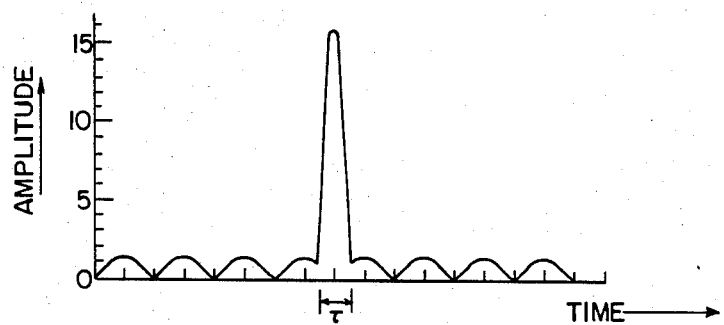
Figure 1D:
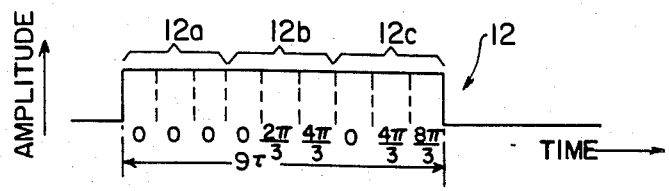
Figure 2:
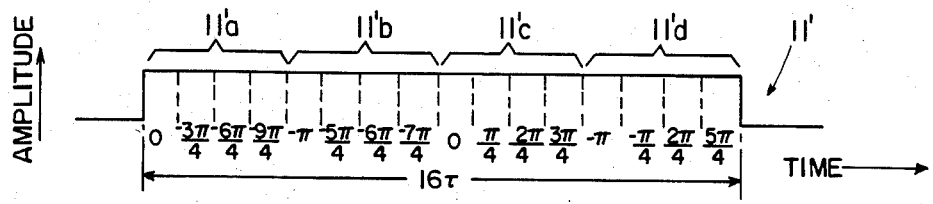
FIG. 2 depicts the pattern of phase changes within a transmitted pulse when coded by the novel polyphase code of this invention.

FIG. 2 shows the pattern of phase changes within a transmitted pulse 11' encoded by the novel code for an exemplary even value of N, that is to say N=4. Pulse 11' is subdivided into four subsequences of subpulses 11'a–d, each subsequence having four subpulses, τ seconds long. It is seen that the frequencies of the end subsequences 11'a and 11'd in the pulse are furthest from the carrier frequency, while the frequencies of the center subsequences 11'b and 11'c are closest to the carrier frequency. Furthermore, the frequencies of the subsequences are symmetrical about the center of the pulse. Specifically, the end subsequences 11'a and 11'd of the pulse have respective frequencies of −3π/4τ and ·3π/4τ, while the center subsequences 11'b and 11'c have respective frequencies of $-\pi/4\tau$ and $\pi/4\tau$. The symmetry of the frequencies and the larger frequencies towards the end of the pulse than at the middle result in greater attenuation by the band-limited radar receiver at the ends of the pulse than at the middle. Thus, the inverse weighting is eliminated and the resultant new weighting is such that ratio between the correlation peak of the auto-correlation function and the level of the sidelobes is increased in contrast with the prior art.

Figure 3:
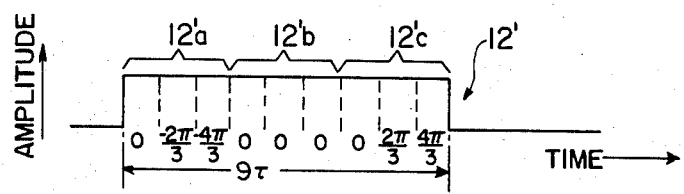
FIG. 3 depicts the pattern of phase changes within another transmitted pulse when coded by the novel polyphase code of this invention.

FIG. 3 shows the pattern of phase changes within a transmitted pulse 12' encoded by the novel code for an exemplary odd value of N, that is to say N=3. Pulse 12' is subdivided into three subsequences of subpulses 12'a-c, each subsequence having three subpulses, $\tau$ seconds long. It is seen that the frequencies of the end subsequences 12'a and 12'c in the pulse are furthest from the carrier frequency, while the frequency of the center subsequence 12'b is at the carrier frequency. Furthermore, the frequencies of the subsequences 12'a and 12'c are symmetrical about the frequency of the center subsequence 12'b (the carrier frequency). Specifically, the end subsequences 12'a and 12'c of the transmitted pulse have respective frequencies of $-2\pi/3\tau$ and $2\pi/3\tau$, while the center subsequence 12'b has a frequency of 0. The symmetry of the frequencies and the larger frequencies at the end of the pulse than at the middle result in greater attenuation by the band-limited radar receiver at the ends of the pulse than at the middle. Thus, the inverse weighting is eliminated and the new weighting is such that the ratio between the correlation peak of the auto-correlation function and the level of the sidelobes is increased in contrast with the prior art. Use of the decoding device of the present invention with this code in a radar, such as the radar described in the referenced patent application, solves the problem of auto-correlation peak-to-sidelobe ratio decrease in the radar.

Figure 4:
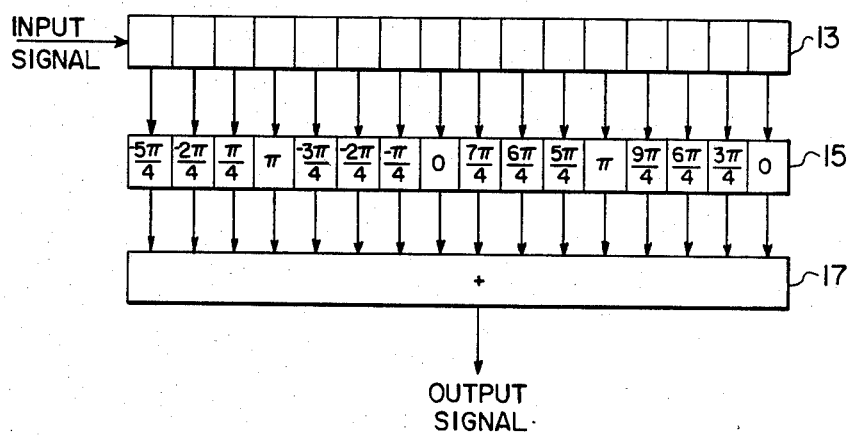
FIG. 4 is a block diagram of an embodiment of the decoding device of this invention.
Figure 5:
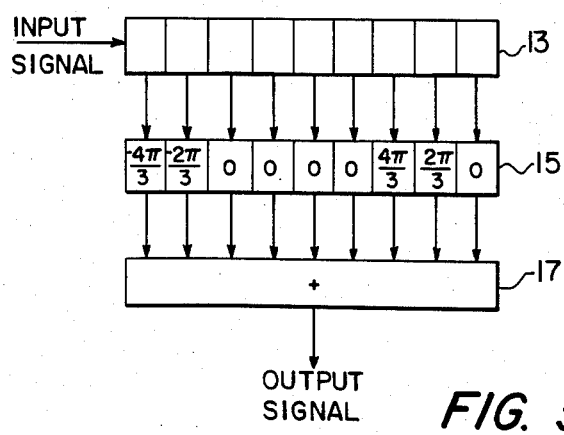
FIG. 5 is a block diagram of another embodiment of the decoding device of this invention.

Preferred embodiments of the decoding device which exhibit the aforementioned advantages are shown in block diagram form in FIG. 4 and FIG. 5. All of the elements shown in FIGS. 4 and 5 are dual parallel channel devices for separately processing the digital words representative of the digital values of the inphase signals (i.e. the values of the real parts of the complex numbers that are the subpulses defined in a coordinate system rotating at the carrier frequency of the transmitted pulse) and the digital words representative of the digital values of the quadrature signals (i.e. the values of the imaginary parts of the complex numbers that are the subpulses defined in a coordinate system rotating at the carrier frequency of the transmitted pulse). The digital words representative of the digital values of the inphase signals and the digital words representative of the digital values of the quadrature signals are obtained by sampling once each subpulse interval the inphase and quadrature components of the returned signal in corresponding analog-to-digital converters disposed in front of the decoding device. All of the connecting leads are composite leads (for example, comprising 16 individual leads with eight for each inphase and each quadrature word respectively, where each word is an 8-bit word).

The decoding device generally comprises a means which provides a decoding phase rotation $-\Delta\phi_{k,p}$ to the kth subpulse in the pth subsequence of the pulse, where $$\Delta\phi_{k,p}=(2\pi/N)[k+pN][p-(\tfrac{1}{2})(N-1)]$$

$k=0, 1, 2, \ldots, N-1$
$p=0, 1, 2, \ldots, N-1$ and a means which adds the phase-rotated subpulses at the same time. While the phase-rotation means may take a variety of forms, conveniently it may take the form illustrated in FIG. 4 and FIG. 5 of $N^2$ stages of a shift register 13 (N=4 in FIG. 4, N=3 in FIG. 5) having an output terminal at each stage, with a uniform delay between the stages equal to the width of a subpulse to permit the set of complex numbers which are the subpulses defined in the rotating coordinate system to be clocked into the shift register; and $N^2$ complex multipliers 15 each coupled to a respective stage of the shift register 13 and producing the phase shifts indicated therein. The phase rotations produced in the complex multipliers 15 are equal in magnitude but opposite in direction to those impressed on the subpulses so that the pulse is decoded when it is centered in the shift register. While the adding means may take a variety of forms, conveniently it may take the form illustrated in FIGS. 4 and 5 of a full adder 17 coupled to the outputs of all of the $N^2$ complex multipliers 15. The sum produced by the adder when the pulse is centered in the shift register is a pulse one subpulse wide with an amplitude $N^2$ times that of each subpulse and a relative phase angle of zero (the auto-correlation peak).

Let the time of observation be defined as t=0 when the pulse is centered in the shift register. As the time of observation is varied about t=0 within a period equal to the width of the pulse, the output of the adder is obtained as the auto-correlation function of the pulse with a well-defined auto-correlation peak at t=0 surrounded by a number of sidelobes.

It is obvious that many modifications and variations of the present invention are possible in light of the above teachings. For example, the received pulse could also be processed in an analog manner although a digital implementation is preferable. It is therefore to be understood that within the scope of the appended claims, the invention may be practiced otherwise than as described.

What is claimed as new and desired to be secured by Letters Patent of the United States is:

1. A decoding device for decoding the pattern of phase changes within a pulse, the pulse being subdivided into an integral number N of subsequences of subpulses, each subsequence having N subpulses at which the phase is changed so forming a polyphase code that is tolerant of precompression bandwidth limitations, comprising:

means for providing a decoding phase rotation $-\Delta\phi_{k,p}$ to each kth subpulse in each pth subsequence of the pulse, where $$\Delta\phi_{k,p}=(2\pi/N)[k+pN][p-(\tfrac{1}{2})(N-1)]$$

$k=0, 1, 2, \ldots, N-1$
$p=0, 1, 2, \ldots, N-1$; and means for adding the phase rotated supulses at the same time.

2. The decoding device recited in claim 1 wherein the phase rotation means includes:

$N^2$ stages of a shift register having an output terminal at each stage; and $N^2$ complex multipliers, each multiplier coupled to a respective stage of the shift register.

3. The decoding device recited in claim 2 wherein the adding means includes:

a full adder coupled to the outputs of all of the $N^2$ complex multipliers.

4. A method of decoding the pattern of phase changes within a pulse, the pulse being subdivided into an integral number N of subsequences of subpulses, each subsequence having N subpulses at which the phase is changed so forming a polyphase code that is tolerant of precompression bandwidth limitations, comprising the steps of:

providing a decoding phase rotation $-\Delta\phi_{k,p}$ to each kth subpulse in each pth subsequence of the pulse, where $$\Delta\phi_{k,p} = (2\pi/N)[k+pN][p-(\tfrac{1}{2})(N-1)]$$

$k = 0, 1, 2, \ldots, N-1$
$p = 0, 1, 2, \ldots, N-1$; and adding the phase-rotated subpulses at the same time.

* * * * *